Figure 1:
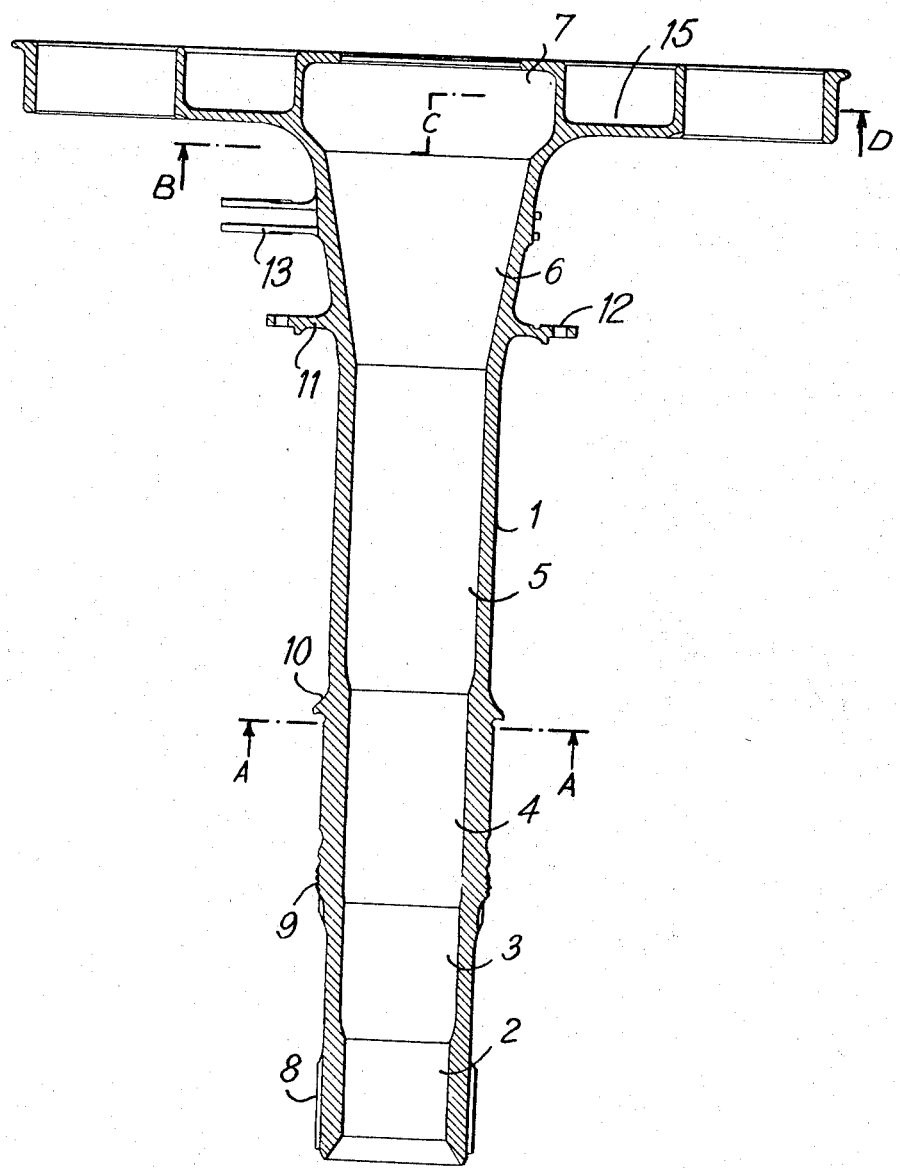

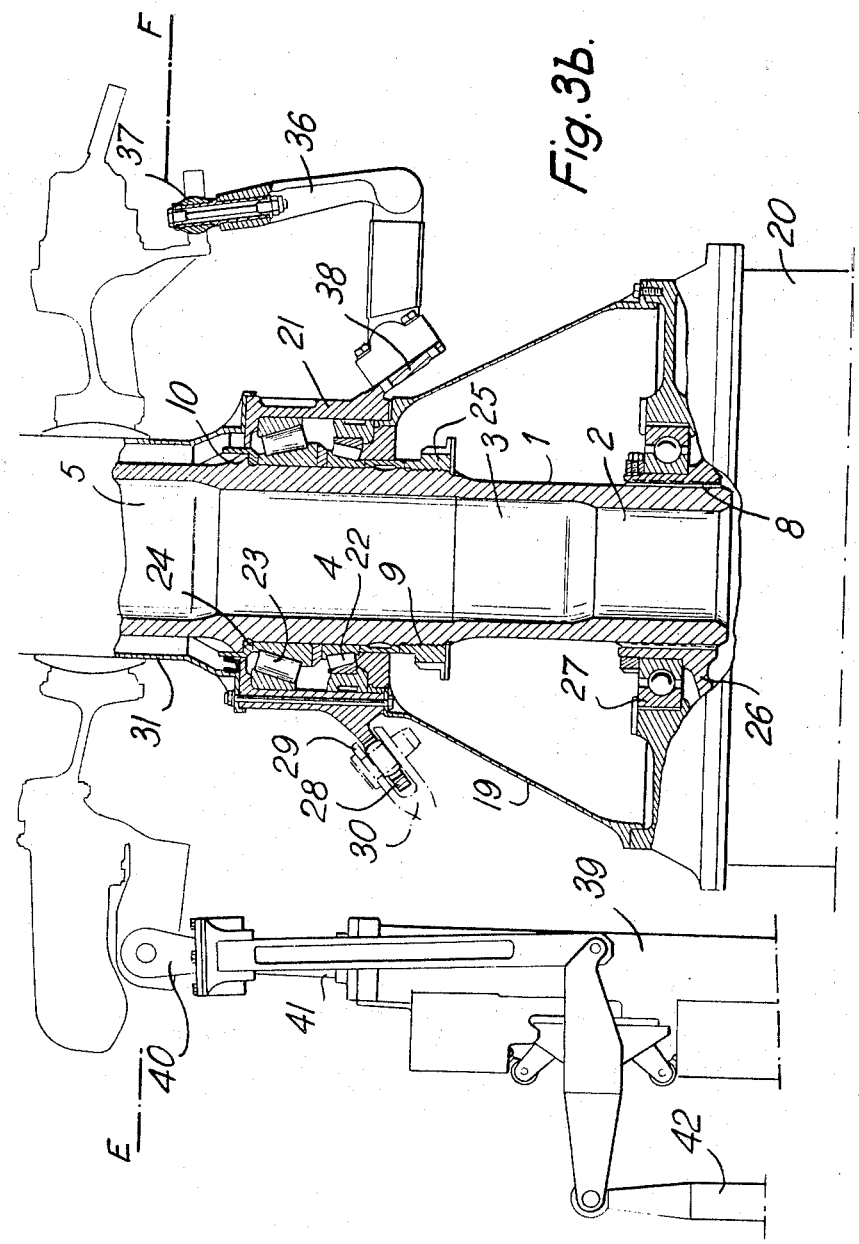

United States Patent Office 3,322,200
Patented May 30, 1967

3,322,200
HELICOPTER ROTOR MASTS
Charles Henry Tresch, Eguilles, France, assignor to Sud-Aviation Societe Nationale de Constructions Aeronautiques, Paris, France
Filed May 11, 1965, Ser. No. 454,823
Claims priority, application France, June 15, 1964, 978,276, Patent 1,419,635
7 Claims. (Cl. 170—160.25)

Helicopter rotors are supported on masts each of which comprises, in currently existing designs, a rotor shaft proper equipped with power take-off means, helicopter suspension means, and means for securing a blade-carrying rotor hub fitted with a sleeve which has internal splines formed therein to enable it to be driven by the rotor shaft and means for rigidly securing it to the upper end of said shaft, said rotor hub bearing external lower and upper fitted flanges set normally to the rotor shaft.

The lower and upper flanges are formed with branches equal in number to the number of blades, whereby to support the latter through the agency of members operating as universal joints and forming the blade drag and flapping hinges. The lower and upper flanges (which include means for securing them to the rotor hub sleeve) are often identical, although it should be noted that in certain designs the upper flange, which is designed to withstand bending loads, is of more robust design than the lower flange, whose sole function is to withstand tensile loads and can therefore be more elastic.

Conventional designs of this type call for the fabrication of a large number of parts and the ancillary assembly means thereof, resulting in high production costs. They also have the disadvantage of resulting in considerable weight, which is counter to the constant striving for maximum lightness in the aeronautical field. Finally, experience shows that incipient corrosion takes place at the contact point of the shaft-hub junction, which is detrimental to durability.

It is the object of the present invention to overcome these drawbacks and to accordingly provide a one-piece helicopter rotor mast consisting of a single hollow part which serves at the same time as the shaft, hub and upper flange by virtue of its flared configuration at its upper end, said part additionally comprising, beneath its upper flange, a base for the securing thereto of a lower flange of flexible type, and, at its lower end, power take-off means. Preferably, the one-piece rotor mast rotates within a fixed cylinder over which is slidably mounted a spherical ring supporting the central non-rotating portion of the swashplate.

The description which follows with reference to the accompanying non-limitative exemplary drawings will give a clear understanding of how the invention can be carried into practice.

Figure 2:
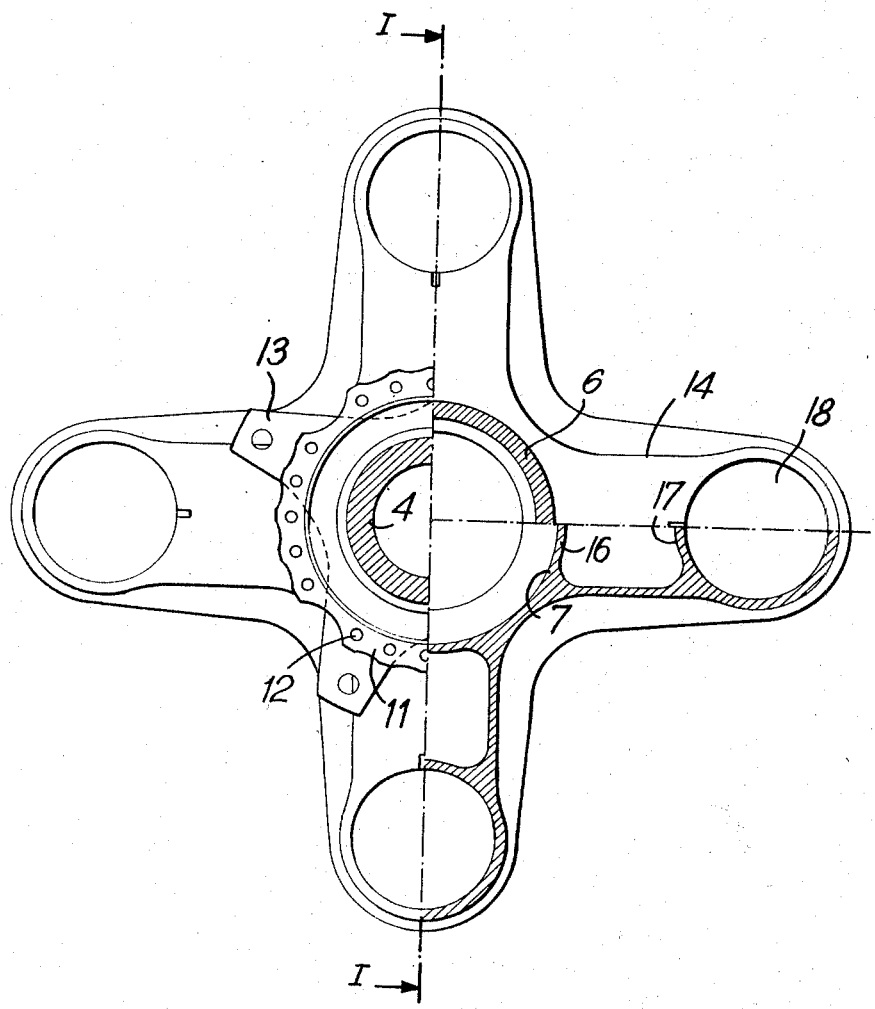
Figure 3A:
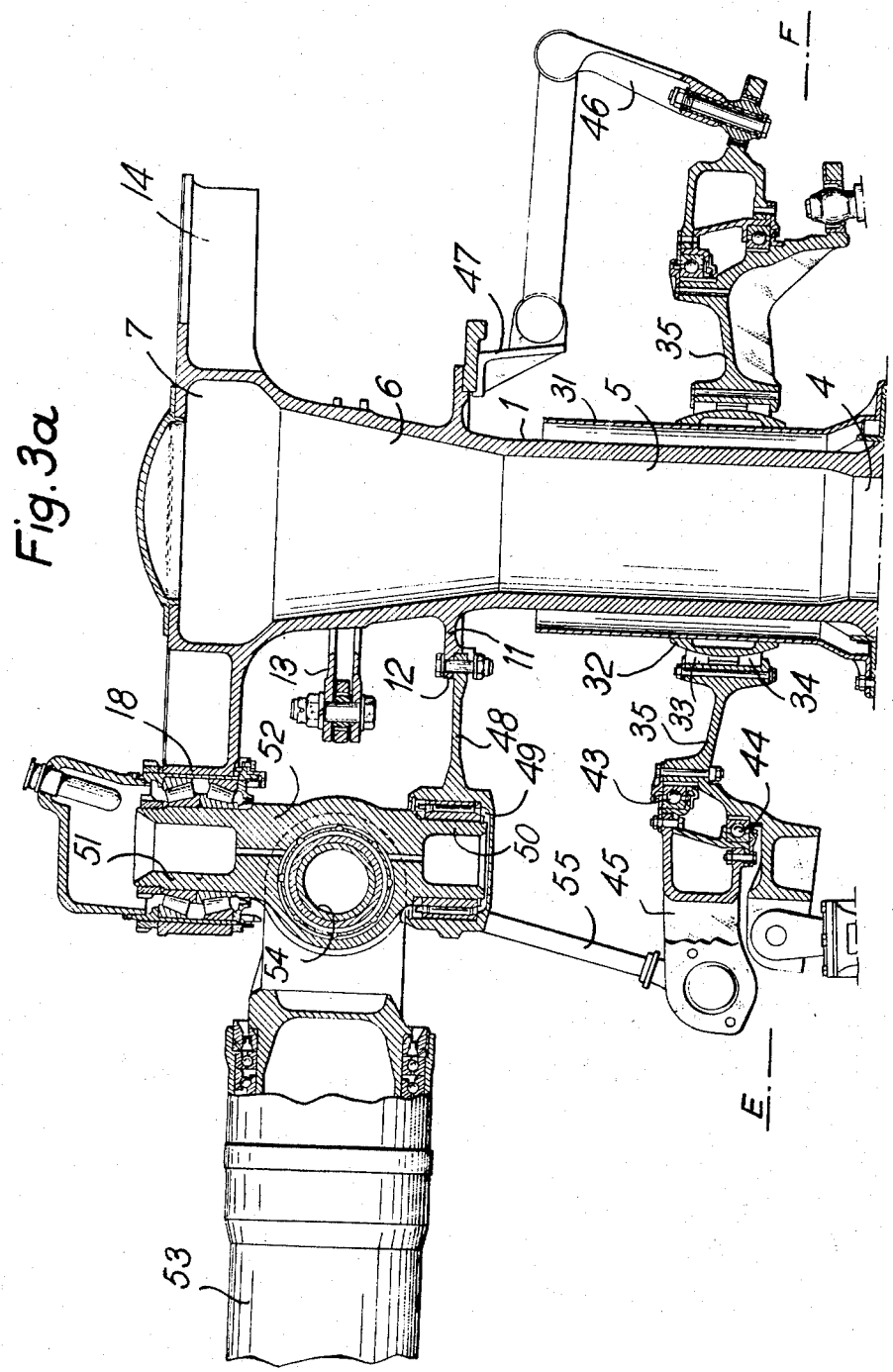

In the drawings:

FIG. 1 is a vertical, diametrical sectional view of a helicopter rotor mast according to the invention, taken through the line I—I of FIG. 2;

FIG. 2 is a composite view, the left-hand half of which is a section taken through the line A—A of FIG. 1, the upper right-hand quarter of which is a section taken through the line B–C of FIG. 1, and the lower right-hand quarter of which is a section taken through the line C–D of FIG. 1; and FIGS. 3a and 3b, which can be joined along the line E–F, illustrate a method of mounting the rotor of FIGS. 1 and 2 on a helicopter.

Referring first to the form of embodiment shown in FIGS. 1 and 2, the rotor mast shown thereon consists of a single hollow part 1 comprising a lower portion divided into four successive sections 2 through 5, an upwardly flared intermediate portion 6 and an upper portion 7 constituting the upper flange of a conventional rotor hub. Section 2 has formed thereon teeth 8 for transmitting the drive from the powerplant. Section 4 has an external screw-thread 9 formed on its lower portion. Between sections 4 and 5 the rotor mast 1 has a projecting collar 10 formed thereon, the function of which will be described hereinafter.

The lower end of the flared intermediate portion 6 is formed with a base 11 embodying a plurality of holes 12 adjacent its periphery. At its upper end the portion 6 carries projecting yokes 13 equal in number to the number of blades with which the helicopter rotor mast is to be equipped. The upper flange 7 is formed with a plurality of lobes 14 equal in number to the number of blades. Each lobe is shaped as a U, 15, the sides of which respectively blend with the cylindrical contour 16 of the mast and with the cylindrical contour 17 of a cylindrical housing 18 formed on the lobe and adapted to receive the upper vertical end of a core-piece the lower vertical end of which lodges in the lower flange, the axis common to said two vertical ends forming the axis of the drag hinge of the corresponding blade.

A constructional form as hereinbefore disclosed offers enhanced rigidity and improved fatigue strength, due to the progressive increase in inertia between the lower end of the mast and the upper flange 7 which is alone in carrying bending moments.

The rotor mast shown in FIGS. 1 and 2 is shown as being designed to equip a four-blade helicopter, the manner in which it is mounted on the helicopter being illustrated in FIGS. 3a and 3b.

The mast 1 is mounted on the cover 19 of the transmission box 20 through the medium of a part 21 housing two superimposed thrust bearings 22 and 23 which act in opposite senses and which are clamped, together with the part 21 and through the medium of a ring 24, between the collar 10 and a nut 25 cooperating with the screw-thread 9. This compound provides the suspension bearing points in flight. The transmission box is equipped with an output drive internal ring-gear 26 engaging with the teeth 8 formed on the lower section 2 of mast 1. The entire assembly is capable of swivelling within the transmission box through the medium of a ball-bearing 27.

Lugs 28 formed on the fixed part 21, in conjunction with yokes 29, are used to connect the tie-rods 30 for securing the assembly to the helicopter structure. Onto the part 21 is fixed a cylindrical sleeve 31 over which is slidably mounted a spherical ring 32 on which are in turn pivotable two crowns 33 and 34 with internal spherical surfaces, rigidly connected to the central portion 35 of the swashplate. This fixed portion 35 is prevented from rotating by a caliper 36 one end of which is connected thereto through a ball-joint 37 and the other end fixed to a projection 38 on the part 21. The central portion 35 is supported and positioned on a system of three servo-control actuators the cylinders 39 of which are anchored at 120° intervals onto the casing of the transmission box 20 and directly coupled to said central portion through the medium of yokes 40 on the ends of their piston rods 41.

These three actuators operate simultaneously or separately in response to control rods 42 and translate the swashplate along the sleeve 31 or cause it to tilt about the spherical ring 32.

The movable swashplate portion 45 is mounted on the central swashplate portion 35 through the medium of ball-bearings 43 and 44 and is rotated by a caliper 46 connecting it to a support 47 fixed beneath the rotor mast base 11. The base 11 additionally has fixed thereto the lower flexible-type flange 48 which is formed with lobes equal in number to the number of rotor blades. Each of these lobes terminates in a housing 49 aligned with the housing 18 in the corresponding lobe 14 of the upper rotor mast portion 7 serving as an upper flange.

Accommodated in these housings 49 and 18 are the lower and upper vertical ends 50 and 51 respectively of the corresponding core-piece 52 acting as the drag hinge for the blade 53. The latter is furthermore pivotable about transverse hollow shafts 54 rigidly united with the core-piece 52 and forming the flapping hinge for said blade. As is well known, these flapping and drag hinges can be disposed in a common plane, or, as shown in FIG. 3a, in different planes, for instance by offsetting the flapping hinge outwardly of the drag hinge. Variations in pitch are transmitted to the blade in the manner well known per se through a rod 55 connected to the movable swashplate portion 45. The rotor mast yokes 13, of which there are as many as there are blades, serve as a pivotal connection for the control rods of conventional drag dampers.

In addition to the enhanced rigidity and improved fatigue strength referred to precedingly, the constructional form according to the present invention affords the following advantages:

(a) A considerably reduced number of parts and assembly means therefor to be fabricated, thus lowering production costs.

(b) Improved durability through elimination of all contact corrosion in the shaft-hub joint.

(c) A saving in weight, stemming firstly from (a) above, and secondly from the fact that the thickness of the hub mass can be less than half the sum of the thicknesses of the shaft and hub of a conventional assembly.

(d) Reduced machining, since the splines for joining the shaft to the hub, as well as the centering cone and locking nut are dispensed with in the arrangement according to the invention.

It is, of course, to be understood that many changes and substitutions of parts may be made in the constructional form hereinbefore described, without departing from the scope of the invention.

What I claim is:

1. A rotor mast for a helicopter having the configuration of a single hollow part forming simultaneously a shaft and upper blade attaching flange for attaching the blades of the rotor, comprising in combination, situated immediately beneath said upper flange, a portion flared upwardly toward said flange, a blade attaching base nearly adjacent the narrowest part of said flared portion, a nearly cylindrical surface blending with said narrowest part of said flared portion, said nearly cylindrical surface including an abutment receiving collar and a threaded part at distance from said collar, and power take-off means at a lower end of said nearly cylindrical surface.

2. A rotor mast for a helicopter according to claim 1, comprising further, in the vicinity of the broadest part of said flared portion, drag damper attaching yokes, the number of which is equal to that of the blades of said rotor.

3. A rotor mast for a helicopter according to claim 1 in which said upper flange is formed with lobes the number of which is equal to that of the blades of said rotor, said lobes having in transversal section a U-form, each said lobe blending by its lateral surface a cylindrical contour of said mast and second cylindrical contour of lobe extremity, each of said lobe extremities offering a cylindrical housing for reception of a blade attachment core piece.

4. A rotor assembly for a helicopter having blades and a transmission box equipped with an output drive ring-gear, said assembly comprising in combination a one-piece rotor mast consisting of a single hollow part having an upper flange, U-shaped lobes equal in number to the number of blades formed on said upper flange with a cylindrical housing adjacent their extremity, a portion located beneath said upper flange and flared externally and upwardly toward it, a base adjacent the lower end of said flared portion, a substantially cylindrical external surface below said flared portion, a screw-thread and a collar on said substantially cylindrical surface, yokes adjacent the upper end of said flared portion equal in number to the number of blades and longitudinal teeth machined on the outer surface of the lower portion of said mast and engaging with said output drive ring-gear of said transmission box, said rotor assembly additionally comprising drag damper control levers pivotally connected to said yokes, means for providing an in-flight suspension thrust abutment, a flexible lower flange fixed to said base and embodying along its periphery housings equal in number to the number of blades, drag hinge core-pieces equal in number to the number of blades and having their ends rotatably mounted in the housings of said lower and upper flanges respectively, a swashplate having a rotating external portion and a non-rotating central portion mounted about said substantially cylindrical external mast surface, and means for slidably and pivotally mounting said swashplate on said mast.

5. A rotor assembly as claimed in claim 4, wherein said means for providing an in-flight suspension thrust abutment comprise, in combination, a part fixedly mounted about said substantially cylindrical external mast surface and supported by said transmission box, two thrust-bearings respectively accommodated between said fixed part and said mast in the radial sense and between said collar and said screw-thread in the axial sense, and a nut screwed onto said screw-thread.

6. A rotor assembly as claimed in claim 4, wherein said means for slidably and pivotally mounting said swashplate onto said mast comprise a fixed part supported by said transmission box, a cylindrical sleeve mounted about said substantially cylindrical external mast surface, means for rigidly securing said sleeve to said fixed part and a spherical centering ring slidably mounted on said sleeve, said swashplate being pivotally mounted on said ring.

7. A rotor assembly as claimed in claim 4, comprising non-coplanar drag and flapping hinges for each blade.

References Cited
FOREIGN PATENTS
652,817   5/1951   Great Britain.

MARTIN P. SCHWADRON, *Primary Examiner.*

EVERETT A. POWELL, JR., *Examiner.*